United States Patent [19]

Williams

[11] 4,332,370
[45] Jun. 1, 1982

[54] FLUID FLOW CONTROL VALVE, PRINCIPALLY OF THE BALL OR PLUG TYPE

[75] Inventor: William F. Williams, Newport, England

[73] Assignee: Serck Industries, Limited, Birmingham, England

[21] Appl. No.: 172,022

[22] Filed: Jul. 24, 1980

[30] Foreign Application Priority Data

Aug. 10, 1979 [GB] United Kingdom ............... 7927912

[51] Int. Cl.³ ............................................. F16K 31/44
[52] U.S. Cl. ...................................... 251/214; 137/72; 251/312
[58] Field of Search ................. 137/72, 74, 67; 251/214, 315, 312; 277/1, 9.5

[56] References Cited

U.S. PATENT DOCUMENTS

| | | | |
|---|---|---|---|
| 2,647,721 | 8/1953 | Volpin | 137/72 |
| 2,942,840 | 6/1960 | Clade | 251/315 X |
| 3,497,178 | 2/1970 | Priese | 251/315 X |
| 3,567,178 | 3/1971 | Nelson | 251/214 |
| 3,630,483 | 12/1971 | Canalizo | 251/214 |
| 3,636,972 | 1/1972 | Scaramucci | 251/315 X |
| 3,843,091 | 10/1974 | Gachot | 251/315 |
| 3,912,221 | 10/1975 | Fensler et al. | 251/214 |
| 4,150,811 | 4/1979 | Condit | 251/315 |
| 4,245,661 | 1/1981 | McGee | 251/214 |
| 4,249,555 | 2/1981 | Scaramucci | 137/72 |

FOREIGN PATENT DOCUMENTS 803448 10/1958 United Kingdom .
1311119 3/1973 United Kingdom .

*Primary Examiner*—A. Michael Chambers
*Attorney, Agent, or Firm*—Ferguson, Baker, Whitham, Spooner & Kroboth

[57] ABSTRACT

A ball or plug valve comprises a ball or plug having a through bore which is rotatable in a metal body to control the flow of fluid through a passage in the body. The ball can be rotated from the exterior of the body by means of a metal stem which is rotatably received in an opening in the metal body. The opening is stepped so as to define a first shoulder which faces the passage in the body, and the stem is correspondingly stepped to define a second shoulder which faces the first shoulder. Under normal operation of the valve, the shoulders are spaced apart slightly and a sealing ring is interposed therebetween. In the event that the sealing ring fails, the pressure of fluid in the passage presses the shoulder on the stem into contact with the shoulder on the body to create a metal-to-metal seal which prevents the escape of fluid to atmosphere through the opening. To make the seal reliable, the shoulders are shaped so that they contact each other only over the outer periphery of the stem shoulder. For example, the shoulders can be mutually tapered, or one of the shoulders can have a raised rim on its outer periphery.

9 Claims, 7 Drawing Figures

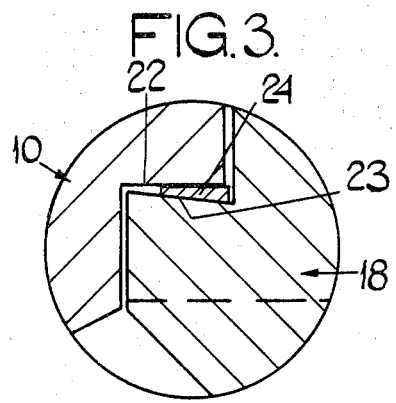
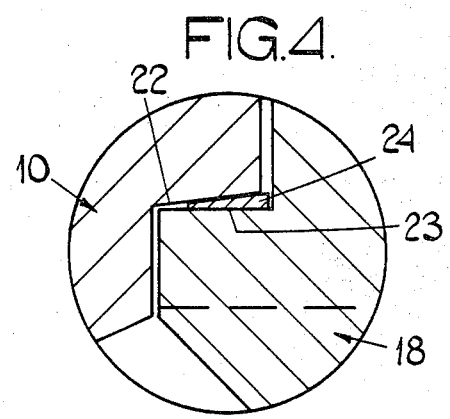
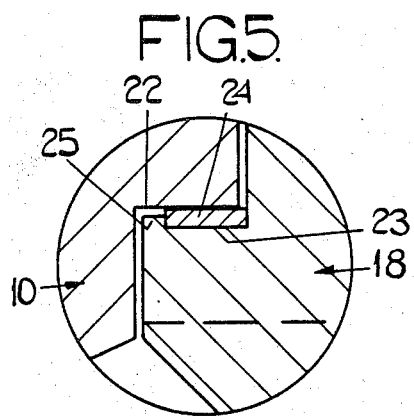
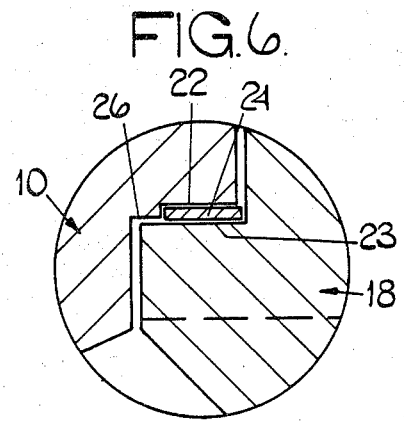
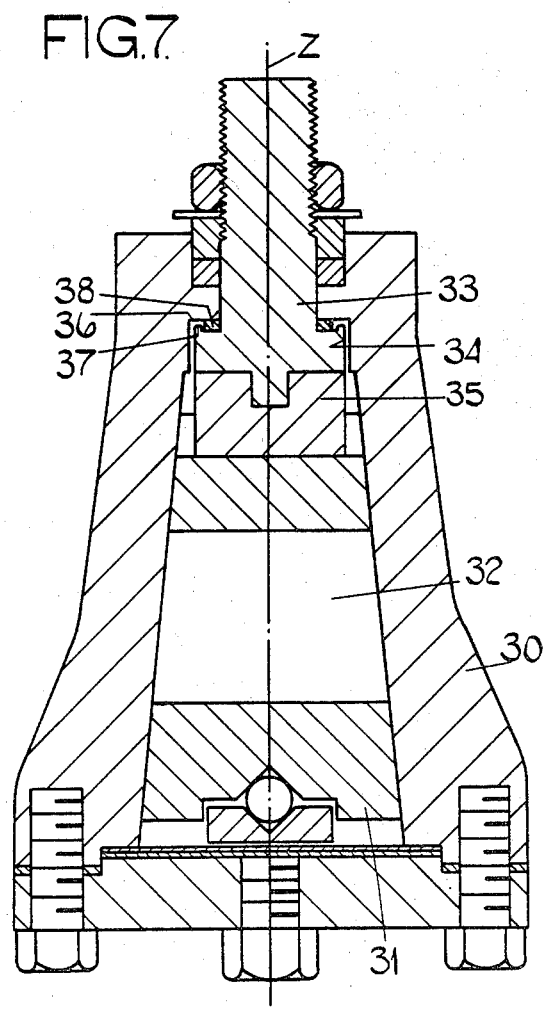

FLUID FLOW CONTROL VALVE, PRINCIPALLY OF THE BALL OR PLUG TYPE

This invention relates to a fluid flow control valve, principally of the ball or plug type.

In fluid flow control valves of the ball or plug type, the ball or plug is rotated in a body to control the flow of fluid through the valve, such rotation of the ball or plug being performed by means of a rotatable stem which extends through an opening in the valve body. In order to prevent the fluid escaping to the surrounding atmosphere, a seal is provided between the stem and the valve body, the seal conventionally being made of graphite, asbestos, p.t.f.e. or the like. In the event of a fire, however, the seal tends to decompose resulting in a leakage path to atmosphere. This can be very dangerous where the fluid flowing through the valve is flammable or toxic.

It is an object of the present invention to obviate or mitigate this problem.

According to the present invention, there is provided a fluid flow control valve comprising a body having a fluid passage therethrough, a valve member disposed in the body and movable between positions in which it respectively permits and prevents fluid flow through the fluid passage, the valve member being thus movable by means of a stem which rotatably extends through an opening in the body, the opening being stepped so as to define a first shoulder on the body which faces the fluid passage and the stem being correspondingly stepped to define a second shoulder which faces the first shoulder, and sealing means interposed between the first and second shoulders, the first and second shoulders being so shaped that they come into mutual contact over an area which is substantially less than the area of the shoulders themselves in the event that the sealing means fails in use.

Preferably, the valve member is rotatable with the stem about an axis transverse to the axis of the fluid passage and has a bore therethrough, the valve member being rotatable between respective positions in which the bore communicates with the fluid passage to permit the flow of fluid therethrough and in which the bore does not communicate with the fluid passage so that the flow of fluid therethrough is prevented.

Advantageously, the first and second shoulders are shaped so that they come into mutual contact only along the outer periphery of the second shoulder in the event that the sealing means fails in use.

In one particular arrangement, one of the shoulders has a raised rim on its outer periphery which is arranged to come into contact with the outer shoulder in the event that the sealing means fails in use. In this case, the sealing means is desirably housed inwardly of the raised rim.

In an alternative arrangement, the first and second shoulders are mutually tapered in a plane which includes the rotation axis of the stem. Preferably, only one of the shoulders is so tapered, this advantageously being the second shoulder.

Embodiments of the present invention will now be described, by way of example, with reference to the accompanying drawings, in which:

FIGS. 3 to 6 are enlarged views of four different sealing arrangements which can be used in the ball valve shown in FIGS. 1 and 2; and FIG. 7 is a sectional side view of a second embodiment of a fluid flow control valve according to the present invention, in the form of a plug valve.

Figure 1:
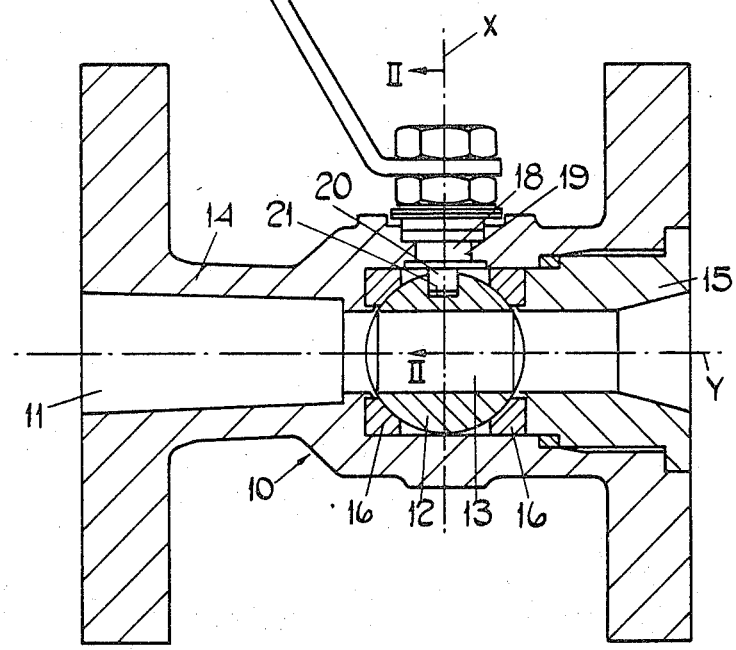
FIG. 1 is a sectional side view of a first embodiment of a fluid flow control valve according to the present invention, in the form of a ball valve.
Figure 2:
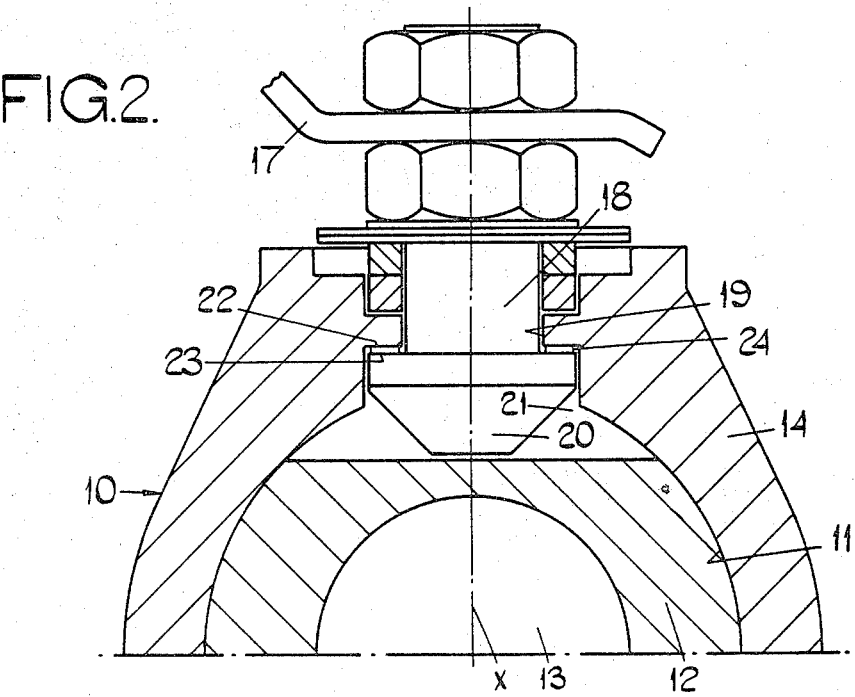
FIG. 2 is a sectional view taken along the line II—II in FIG. 1.

A first embodiment of the fluid flow control valve in the form of a ball valve is shown in FIGS. 1 and 2, and comprises a body 10 having a fluid passage 11 therethrough and a ball 12 having a through bore 13. In order to permit assembly of the valve, the body 10 is constructed of two parts 14 and 15 between which the ball 12 is received. A pair of annular valve seats 16 respectively surround part of the passage 11 on either side of the ball 12 and are engaged by the latter.

In order to control the flow of fluid through the passage 11, the ball 12 can be rotated about an axis x perpendicular to the axis y of the passage 11 between respective positions in which the through bore 13 communicates with the passage 11 to permit fluid flow through the valve (as illustrated in FIG. 1) and in which the bore 13 is sealed from the passage 11 by the seats 16 so that fluid flow through the valve is prevented. Such rotation of the ball 12 is performed by a wrench or lever 17 through the intermediary of a stem 18 which is rotatably received in an opening 19 in the body part 14. The stem 18 has a wedge-shaped protrusion 20 on one end thereof which is received in a recess 21 in the ball 12 so that the ball is thereby keyed to the stem for rotation therewith.

The opening 19 in the body 10 is stepped so as to define a first annular shoulder 22 which surrounds the stem 18 and faces the fluid passage 11. The stem 18 is correspondingly stepped so as to define a second annular shoulder 23 which faces the first shoulder 22. Under normal operating conditions of the valve, the shoulders 22 and 23 are spaced apart by a small amount and have a sealing ring 24 interposed therebetween to seal the valve against the escape of fluid from the passage 11 to atmosphere through the opening 19.

The body 10, ball 12 and stem 18 are all made of metal: more particularly, the body 10 and the stem 18 are made of high-temperature metal such as stainless steel, carbon steel, titanium or bronze. In the event that the sealing ring 24 is destroyed by fire or otherwise fails, the pressure of the fluid in the passage 11 moves the stem 18 progressively upwards as viewed in FIGS. 1 and 2 until the shoulder 23 comes into contact with the shoulder 22, thereby creating a metal-to-metal seal therebetween. In order that the force holding the shoulder 23 in contact with the shoulder 22 is sufficient to give a reliable seal against the escape of fluid from the passage 11 to atmosphere, the shoulders are so shaped that they contact each other over an area which is small compared to the area of the shoulders themselves, such that the seal is formed under high pressure. Moreover, the effect of the pressure is utilized to the maximum by arranging for the area of contact to be only on the outer periphery of the shoulder 23.

FIGS. 1 to 6 illustrates four different constructions of the metal-to-metal seal between the shoulders 22 and 23. In FIGS. 3 and 4, the shoulders are mutually tapered in a plane which includes the rotation axis x of the stem so that a line contact is formed between the outer periphery of the shoulder 23 and the shoulder 22 in the event that the sealing ring 24 fails, and the sealing ring 24 is correspondingly of wedge-shaped radial cross-section. In the construction of FIG. 3, the mutual taper is formed by making the shoulder 23 of frusto-conical configuration while the shoulder 23 is planar and perpendicular to the axis x; in the construction of FIG. 4, this arrangement is reversed so that the shoulder 22 is frusto-conical and the shoulder 23 is planar. In FIG. 5, the shoulder 23 is provided with a raised rim 25 on its outer periphery and the sealing ring 24 is housed radially inwardly of the rim 25. In FIG. 6, a raised rim 26 is provided on the shoulder 22 and is arranged to engage the outer periphery of the shoulder 23 in the event of the sealing ring 24 failing, the sealing ring being housed radially inwardly of the rim 26. In each case, sufficient clearance is provided between the body 10 and the stem 18 in the vicinity of the sealing ring 24 to accommodate the products of decomposition (i.e. sealing material, fluid, metal scale) during a fire and any material which is crushed between the shoulders.

Since fire resistance is provided by the metal-to-metal seal between the shoulders 22 and 23 rather than by the sealing ring 24, the sealing reliability of the valve is extended to higher temperatures. Moreover, the sealing ring 24 need not be designed to withstand high temperatures, and therefore the material from which it is made can be selected to give optimum performance during normal operation: the sealing ring can thus be made of p.t.f.e. or any other suitable filled or non-filled plastics.

A second embodiment of the fluid flow control valve in the form of a plug valve is shown in FIG. 7 and comprises a body 30 having a fluid passage (not illustrated) therethrough and a plug 31 disposed in the fluid passage and having a through bore 32. The plug 31 is rotatable about an axis z perpendicular to the axis of the fluid passage between respective positions in which the through bore 32 communicates with the fluid passage to permit fluid flow through the valve and in which the bore 32 does not communicate with the fluid passage and prevents fluid flow through the valve (as illustrated in FIG. 7). The plug 31 is rotatable in this manner from the exterior of the body 30 by means of a stem 33 which is rotatably received in an opening 34 in the body 30 the stem 33 being keyed to a collar 35 which is in turn keyed to the plug 31. The opening 34 is stepped so as to define a first shoulder 36 which faces the fluid passage, and the stem 33 is correspondingly stepped so as to define a second shoulder 37 which faces the first shoulder 36. Under normal operation of the valve, the shoulders 36 and 37 are spaced slightly apart and have a sealing ring 38 interposed therebetween.

As in the ball valve illustrated in FIGS. 1 and 2, the shoulders are shaped so that they come into mutual contact over only the outer periphery of the second shoulder in the event that the sealing ring fails. To this end, the shoulders 36 and 37 can have any of the constructions described above in relation to FIGS. 3 to 6, mutatis mutandis.

The fluid flow control valves described above provide reliable sealing (i.e. sufficient to satisfy BS 5146: 1974) against the escape of fluid to atmosphere through the opening 19 or 34 after being subjected to a fire test in which typically valve temperatures in excess of 700° C. are attained for periods of about twenty minutes. The valves are therefore of great use in petrochemical plants, petroleum refineries and reservoirs, etc. where escape of the contained fluid to atmosphere in a fire can be very dangerous.

It is to be appreciated that the present invention is applicable not only to valves of the ball and plug type, but also to any other type of valve which is operated by means of a rotatable stem.

I claim:

1. A firesafe fluid control valve comprising a body made of firesafe material and having both a fluid passage therethrough and a stepped opening therein, a valve member mounted in said body for movement between a first position in which said valve member permits fluid flow through the fluid passage and a second position in which said valve member prevents fluid flow through the fluid passage, a stem made of firesafe material connected to said valve member and rotatably extending through said stepped opening in said body for rotation about a rotation axis, means on said body for defining a first shoulder facing the fluid passage, said defining means comprising said stepped opening, means on said stem for defining a second shoulder facing said first shoulder, said second shoulder including an outer periphery, and sealing means interposed between said first and second shoulders, said first shoulder having an outer periphery, said first and second shoulders normally being spaced apart by said sealing means, said first shoulder comprising means spaced inwardly from said first shoulder outer periphery for contacting said second shoulder only at said outer periphery of said second shoulder upon failure of said sealing means.

2. The fluid control valve according to claim 1, wherein said means for contacting comprises one of said first and second shoulders having a raised rim on an outer periphery thereof which comes into contact with the other of said first and second shoulders upon failure of said sealing means.

3. The fluid control valve according to claim 2, wherein said sealing means is housed inwardly of said raised rim.

4. The fluid control valve according to claim 1, wherein said first and second shoulders are tapered with respect to each other.

5. The fluid control valve according to claim 4, wherein one of said first and second shoulders is generally frusto-conical and the other of said first and second shoulders is generally planar.

6. The fluid control valve according to claim 4, wherein said first shoulder is generally frusto-conical and said second shoulder is generally planar.

7. The fluid control valve according to claim 1, wherein said valve member is rotatable with said stem about said rotation axis between said first and second positions, and said stem is capable of movement relative to said valve member in a direction along said rotation of axis upon failure of said sealing means.

8. The fluid control valve according to claim 1, in the form of a ball valve.

9. The fluid control valve according to claim 1, in the form of a plug valve.

* * * * *